United States Patent [19]
Lee et al.

[11] Patent Number: 5,952,448
[45] Date of Patent: Sep. 14, 1999

[54] STABLE PRECURSOR OF POLYIMIDE AND A PROCESS FOR PREPARING THE SAME

[75] Inventors: Myung-Hun Lee; Seo-Bong Lee; Chang-Jin Lee; Eun-Kyoung Kim; Mi-Seon Ryoo, all of Taejeon, Rep. of Korea

[73] Assignee: Korea Research Institute of Chemical Technology, Taejeon, Rep. of Korea

[21] Appl. No.: 09/001,135

[22] Filed: Dec. 30, 1997

[30] Foreign Application Priority Data

Dec. 31, 1996 [KR] Rep. of Korea ................ 96-80009
Dec. 3, 1997 [KR] Rep. of Korea ................ 97-65450

[51] Int. Cl.$^6$ ............................ C08G 73/10; C08G 69/26
[52] U.S. Cl. .................... 528/170; 528/125; 528/126; 528/128; 528/171; 528/172; 528/173; 528/174; 528/179; 528/183; 528/185; 528/220; 528/229; 528/350; 528/351; 528/353; 525/432
[58] Field of Search ........................... 528/170, 353, 528/171, 172, 173, 174, 179, 125, 128, 183, 185, 220, 229, 350, 351; 525/432

[56] References Cited

U.S. PATENT DOCUMENTS

| 5,202,412 | 4/1993 | Auman et al. | 525/432 |
| 5,304,626 | 4/1994 | Burgess et al. | 528/353 |
| 5,357,032 | 10/1994 | Rhee et al. | 528/353 |
| 5,393,864 | 2/1995 | Summers | 528/353 |
| 5,484,879 | 1/1996 | Buchanan et al. | 528/353 |
| 5,686,559 | 11/1997 | Rhee et al. | 528/353 |

*Primary Examiner*—P. Hampton-Hightower
*Attorney, Agent, or Firm*—Senniger, Powers, Leavitt & Roedel

[57] ABSTRACT

This invention relates to a poly (imide amic ester) random copolymer, a precursor thereof, and a process for preparing the same. Specifically this invention relates to a novel precursor of polyimide, poly(imide amic ester) which is chemically stable and has excellent workability in either liquid or solid state, a polyimide obtained therefrom and a process for preparing the same.

11 Claims, 3 Drawing Sheets

5,952,448

STABLE PRECURSOR OF POLYIMIDE AND A PROCESS FOR PREPARING THE SAME

This application claims priority from Korean Patent Application No. 80009/1996 filed in Korea on Dec. 31, 1996.

BACKGROUND OF THE INVENTION

1. Field of the Invention

The present invention relates to a poly (imide amic ester) random copolymer, a precursor thereof, and a process for preparing the same; more particularly, to a novel precursor of polyimide, poly (imide amic ester) which is chemically stable and has excellent work ability in either liquid or solid state, a polyimide obtained therefrom and a process for preparing the same.

2. Description of the Prior Art

Generally, polyimide is produced by the imidification of a poly (amic acid) as a precursor through thermal and chemical dehydration, which is prepared by the reaction of diamine and dianhydride.

The polyimide so produced is usually insoluble in an organic solvent (except for in rare cases) and mostly has neither fusing ability nor workability. When preparing polyimidic resin, usually the solution of the poly (amic acid) (a precursor of polyimide) is processed and subjected to imidification through thermal or chemical process to produce the polyimide which is then formed into the desired polyimidic resin.

However, the poly (amic acid) used as a precursor of polyimidic resin is often decomposed into an amine terminal radical and an acid anhydride terminal radical by depolymerization due to reaction equilibrium when it is stored in its liquid state, when it is being processed into a desired shape or when it is subjected to thermal imidification. As the result, the characteristics and quality of polyimide finally obtained is deteriorating and an offensive odor is produced due to the diamine compound produced as a result of the decomposition.

In addition, acid anhydride radical is formed in a small amount terminal as a result of the decomposition and will react with water flown in from outside or produced during the imidification and thus will be transformed into dicarboxylic acid which can no longer react with the amine terminal radical and the molecular weight of the poly (amic acid) will decrease over time when stored.

Such decrease in the molecular weight of the poly (amic acid) affects the characteristics of the polyimide produced therefrom. The product of the polyimide is undesirably deteriorating in its mechanical intensity and other chemical and physical properties.

Meanwhile, not many solutions which will hinder such depolymerization of poly (amic acid) have been reported:

The most frequently suggested method to suppress depolymerization of poly (amic acid) is to keep/store the solution of poly (amic acid), a precursor of poly imide at low temperature or to use the solution of poly (amic acid) shortly after its synthesis.

Schmidt et al. disclosed a process for preparing polyimide wherein a poly (amic ester) as a precursor instead of poly (amic acid). The poly (amic ester) is obtained by esterification of carboxylic acid which is the cause of the chemical instability of the amic acid group.

Thus, poly (amic ester) is a precursor having an improved chemical stability work ability (Macromolecules, 25, 6784 (1992)). The polyimide produced by this process has the characteristics of excellent stability and improved workability. However, the synthesis often tetracarboxylic acid diester dichloride which is an essential monomer for the preparation of poly(amic ester) is very troublesome and it reacts sensitively with nucleophilic compounds such as alcohol or water thereby being transformed into a compound which cannot be used as a monomer.

Thus, the tetracarboxylic acid diester dichloride is not only easily inactivated during storage but also has a strong toxicity which may cause many problems. In addition, in the solution of poly (amic ester) made by using such dichloride as monomer, chlorine produced in the reaction can exist in either ionic or molecular state, which may induce various kind of problem. Particularly, when polyimide is utilized for an industrial insulator which is one of its main utilities, fatal problems such as corroding electronic parts and deterioration of dielectric strength may be caused.

Meanwhile, Korean Patent Application No, 91-20171 and its corresponding U.S. patent application Ser. No. 07/930, 376 filed on Aug. 17, 1992 and issued on Oct. 18, 1994 as U.S. Pat. No. 5,357,032, disclosed a poly(amic ester)formed by esterifying one half of acid radicals in a poly (amic acid) and a process for preparing aromatic polyimide-exchanged copolymerby imlidifingthe poly(amic ester) under heating. Since one half of the acid in the poly (amic acid) is esterified, the amount of free amic acid in the poly (amic ester ) produced is decreased by approximately 50% in comparison with that of a usual poly (amic acid). Accordingly, the poly (amic ester) has an increased stability in its liquid state.

In the same applications, an improved poly (imide amic ester) which is produced from the above invention and a process for preparing a poly (imide amic ester) which is a precursor of polyimide were also disclosed, in which the amic acid group of the poly (imide amic ester) is transformed selectively into imide radical by chemical imidification. Since the unstable amic acid group is removed, the stability of the polyimide exchanged copolymer solution is further improved.

However, the above two processes should be carried out through a complicated synthesis of a diamine monomer and the high polymer produced is restricted to polyimide-exchanged copolymer. Consequently, the above two processes cannot be used for the preparation of polyimide.

Under these circumstances, the inventions of the present invention strived to solve the above problems and discovered that when esterifying at least part of amic acid radicals of a poly (amic acid) which has been previously used as a common precursor of polyimide and than imidifying the remaining amic acid radicals that are not esterified, a poly (imide amic ester) random copolymer having coexisted ester and imide radicals is prepared.

The poly (imide amic ester) random copolymer has an improvement when in solution, can be used for the preparation of polyimide regardless of the structure of the poly imide and has many other advantages, when compared with poly (amic acid) a conventional poly imide precursor.

Since the poly (imide amic ester) prepared by the aforementioned process is very stable and soluble in solvents and has an excellent work ability as a solution, the poly imide resin prepared by thermal imidification of the poly (imide amic ester) preserved excellent characteristics which can be used in the electronic industry as a heat-resistant insulting high polymer material.

SUMMARY OF THE INVENTION

An object of the present invention is to provide a poly (amic acid ester) random copolymer which can be used as a precursor of poly (imide amic ester) and/or polyimide, and the preparation process thereof.

Anther object of the present invention is to provide a poly (imide amic ester) random copolymer, and the preparation process thereof.

A future object of the present invention is to provide a novel process for preparing a polyimide compound using the precursor of the present invention.

(A): viscosity change with time of poly (imide amic ester) precursor according to the present invention, (B): viscosity change with time of poly (amic acid ester) precursor (Comparative Example 1), and (B): viscosity change with time of poly (amic acid) precursor (Comparative Example 2).

Figure 2:
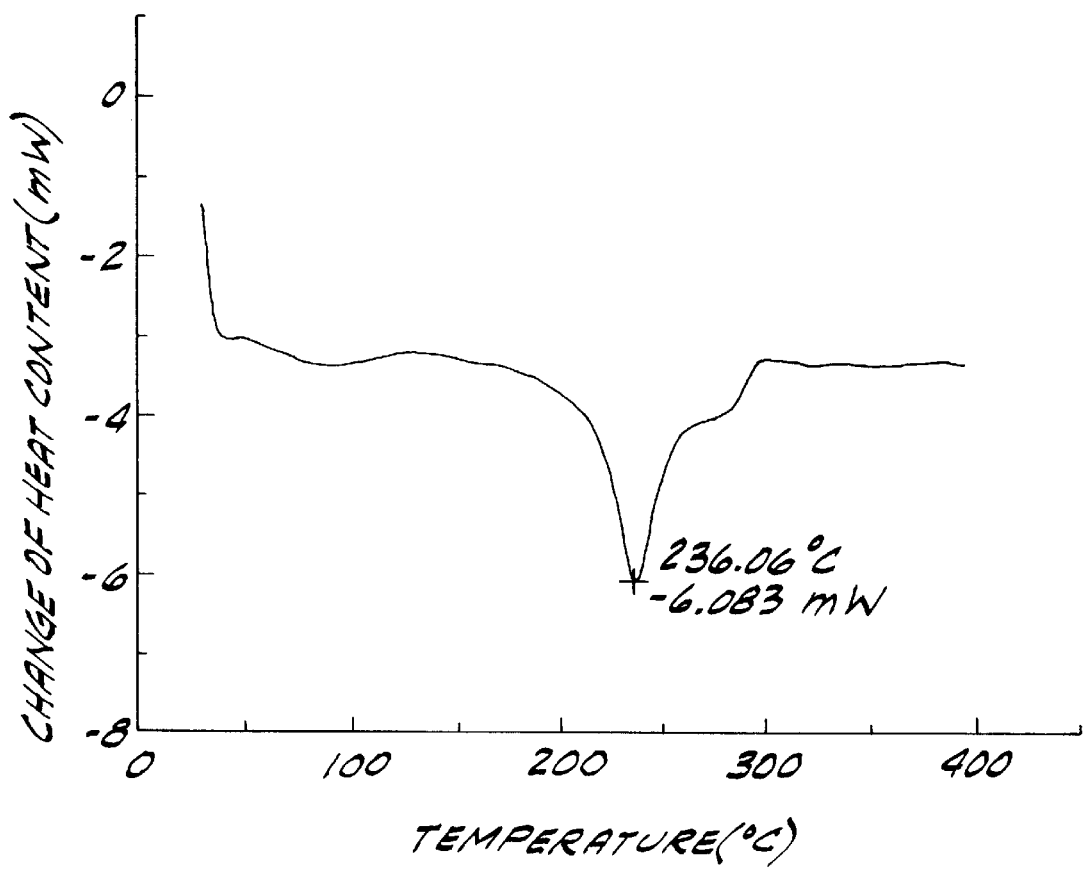

FIG. 2 is a graph showing the result of differential scanning calorimetry on the poly (imide amic ester) prepared in Example 1 of the present invention.

Figure 3:
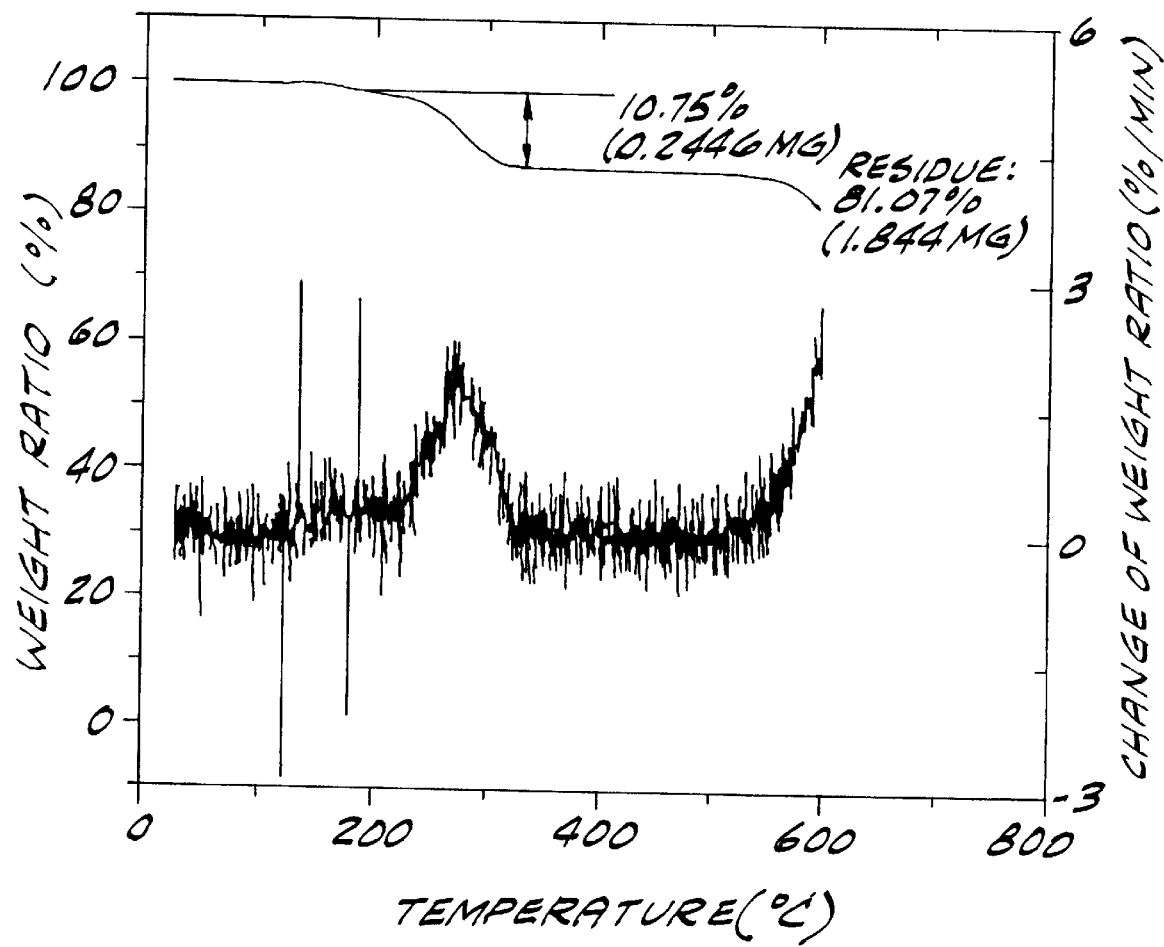

FIG. 3 is a graph showing the result of thermogravimetric analysis on the poly (imide amic ester) prepared in Example 2 of the present invention.

Figure 4:
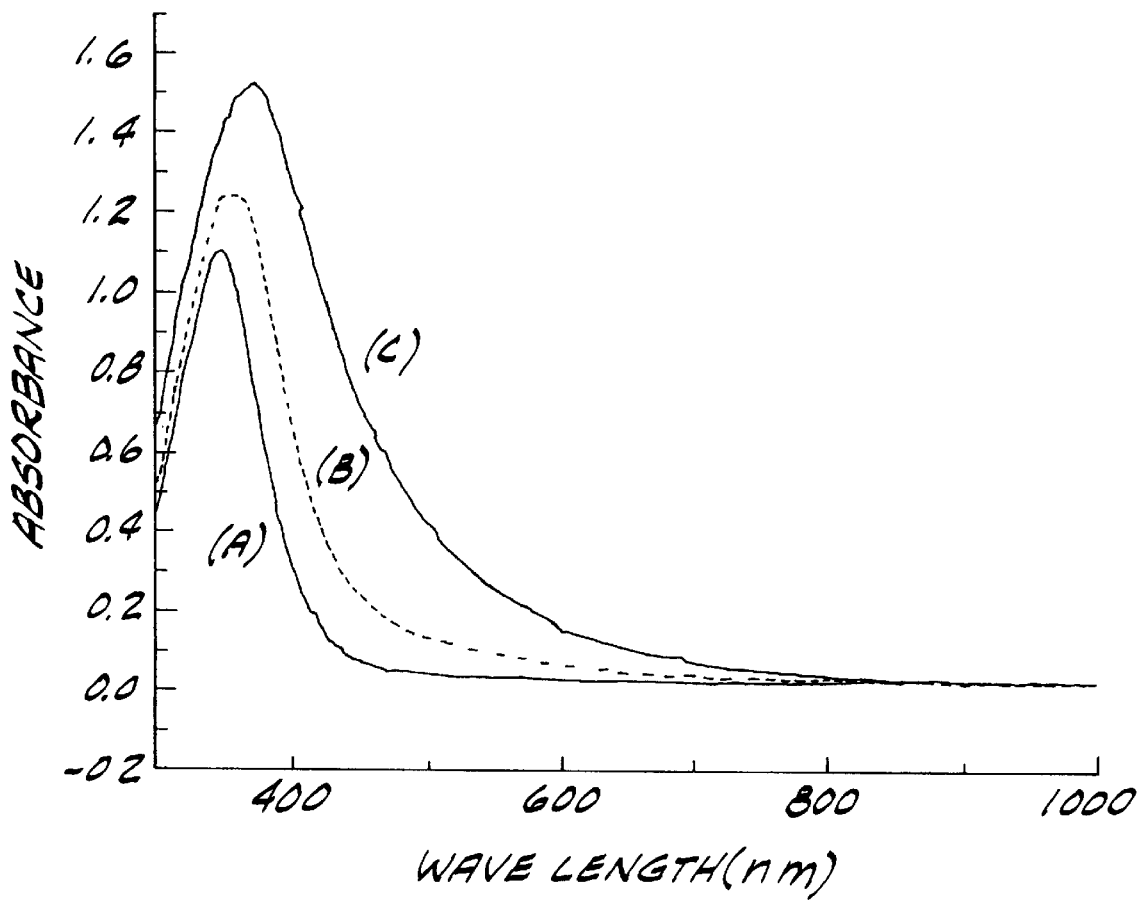

FIG. 4 is a graph showing the absorbance of poly (amic acid ester) precursor film and polyimide films, wherein (A), (B) and (C) are as follows:

(A): absorbance of poly (imide amic ester) precursor film of the present invention, (B): absorbance of a polyimide film prepared from poly (imide amic ester) precursor of the present invention, and (B): absorbance of a polyimide film prepared from conventional poly (amic acid) precursor.

DETAILED DESCRIPTION OF THE INVENTION

The present invention relates to a poly (amic acid ester) random copolymer of formula (1)

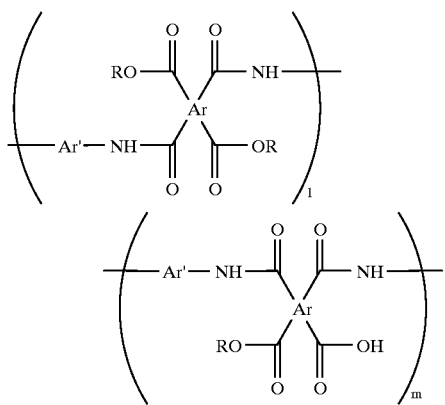

(1)

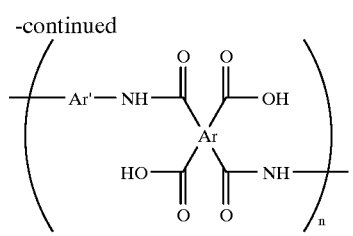

wherein Ar is at least one selected from the group consisting of

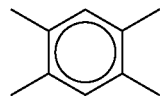

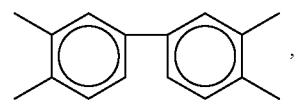

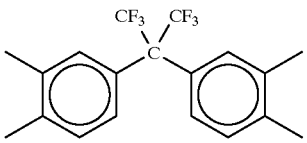

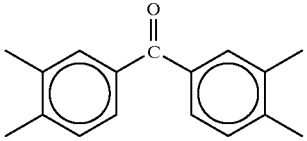

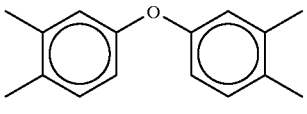

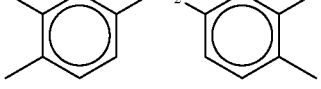

and

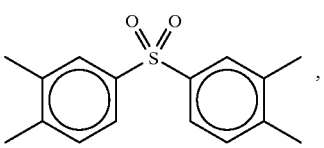

Ar' is at least one selected from the group consisting of

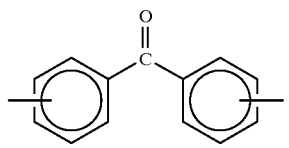

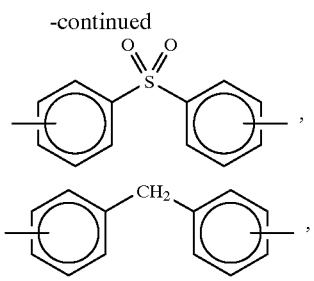

and

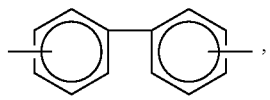

R is at least one selected from the group consisting of $CH_3$, $CH_2CH_3$, $CH(CH_3)_2$, $(CH_2)_2CH_3$, $(CH_2)_3CH_3$, $C(CH_3)_3$ and $CH_2CH(CH_3)_2$, and l, m and n is respectively a number of 0 to 1, provided that when l+m+n=1, the total amount of amic acid radical (COOH) and amic ester radical (COOR) included in each repeating unit is respectively in the ratio of 0.0 to 0.7 and 1.0 to 0.3.

Secondly, the present invention relates to a poly (imide amic ester) random copolymer having a repeating unit of formula (2)

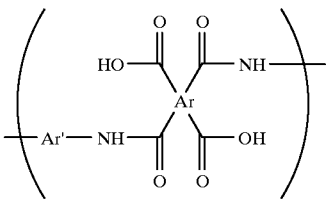

wherein Ar and Ar' are as defined herein above, and esterifying partly the poly (amic acid) with an alkyl halide of formula RX wherein R is as defined herein above, X is one selected from Cl, Br and I in an optional solvent in the presence of a base catalyst and optionally a phase transition catalyst.

According to one preferred embodiment of the present invention, the poly (amic acid) having the repeating unit of formula (5) can be subjected to esterification with an alkyl halide of formula RX wherein said esterification is carried out in a polar organic solvent such as N-methyl pyrolidone, N,N-dimethyl acetamide, N,N-dimethyl formamide, hexamethylene phosphoramide and dimethyl sulfoxide in the presence of at least one alkali carbonate selected from the group

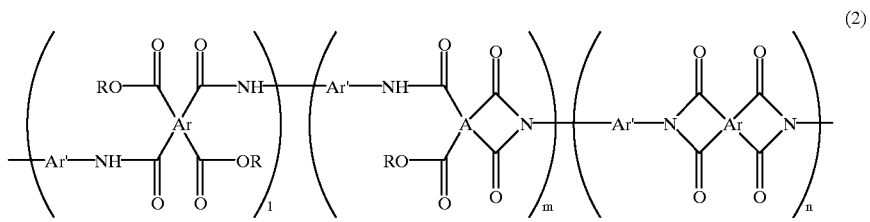

wherein Ar, Ar, R, l, m and n is as defined herein above.

Thirdly the present invention relates to a process for preparing the poly (amic acid ester) of formula (1), which comprises reacting a tetracarboxylic acid dianhydride monomer of formula (3)

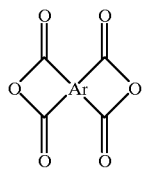

(3)

wherein Ar is as defined herein above with a diamine monomer of formula (4)

(4)

wherein Ar' is as defined herein above to produce a poly (amic acid) having a repeating unit of formula (5)

consisting of potassium carbonate, sodium carbonate, potassium bicarbonate, sodium bicarbonate and the like, and optionally in the presence of at least one phase transfer catalyst selected from the group consisting of teltraalkylammonium halide, aryltrialkylammonium halide and the like, or in an organic solvent such as N-methyl pyrolidone in the presence of at least one organic base selected from the group consisting of 1.5-diazabicyclo[4.3.0]non-5-ene, 1.8-diazabicyclo[5.4.0]undec-7-ene and the like.

Fourthly the present invention relates to a process for preparing a poly (imide amic ester) random copolymer having a repeating unit of formula (2), which comprises mixing a poly (amic acid ester) of formula (1) with at least one organic amine such as a tertiary amine selected from pyridine, trimethyl amine, triethyl amine, tripropyl amine and the like in the amount of 0.5 to 2.2 equivalent to the amount of the poly (amic acid ester) together with an acetic anhydride and then the mixture is stirred under heating at 30 to 90° C. for 0.5 to 10 hours.

Fifthly the present invention relates to a process for preparing a poly imide of repeating units of formula (6)

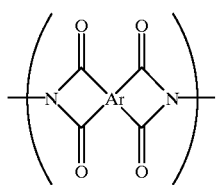

(6)

wherein Ar is as defined herein above which comprises drying a poly (imide amic ester) of formula (2) at no more than 200° C. to remove solvent, and then subjecting it to a heat treatment which is characterized in that the temperature is elevated at a rate of 1~20° C./minute regularly from about 150 to 240~450° C. or in that the temperature is elevated from about 50° C. from about 150 to 240~450° C. in an interval of 30 to 120 minutes.

The present invention is explained in detail below.

The monomer used for preparing the poly (imide amic ester) random copolymer of the present invention is a tetracarboxylic acid dianhydride of formula (3) and a diamine of formula 4.

Approximately any kind of tetracarboxylic acid dianhydride commonly used for preparing poly imide can be employed as the tetracarboxylic acid dianhydride. Particularly, a tetracarboxylic acid dianhydride having a structure of a centered aromatic benzene ring such as Ar of the formula (1) which preserves an excellent heat-resistance can be used. Alternatively, a non-aromatic tetracarboxylic acid dianhydride such as 1,2,4,5-cyclohexyl tetracarboxylic acid dianhydride having a centered alkyl radical can also be used. For preparing the poly (imide amic ester), practically at least one selected from tetracarboxylic acid dianhydride of formula (3) may be used.

The Ar' in the diamine of formula (4) represents the same aromatic radicals as defined in Ar' of the formula 1, which consists of a centered aromatic radical such as benzene and the like having amine substituted at both terminals.

In case where it is not required to select a compound of high heat resistance, a non-aromatic diamine comprising a linear, branched or cyclic alkyl backbone such as 1,6-diaminohexane, 1,4-diaminocyclohexane, 3,4-dimethyl-1,6-diaminohexane or the like can be used also.

Practically at least one selected from diamine of the formula (4) is used to prepare the poly (imide amic ester).

Poly (imide amic ester) having a repeating unit of formula (1) according to the present invention may have various constitutions based on the combination of tetracarboxylic acid dianhydride of formula (3) and the diamine of formula 4. The characteristics of poly (imide amic ester) based on the constitutions.

The process for preparing the compounds of the present invention is described below.

STEP 1: Preparation of Poly (amic acid)

A diamine of formula (4) is reacted with an equivalent amount of a tetracarboxylic acid dianhydride of formula (3) in the presence of hexamethylene phosphoramide, optionally in polar organic solvents such as N-methyl pyrolidone, N,N-dimethyl acetamide, N,N-dimethyl formamide, dimethyl sulfoxide or the like.

The amount of hexamethylene phosphoramide is 20~100% relative to the total amount of the organic solvents used. The solid content is preferably 2~20% relative to the organic solvent and the reaction is carried out under stirring at 0–80° C. for 30 minutes to 24 hours.

The poly (amic acid) of formula (5) produced by such reaction has the same chemical structure as the poly (amic acid) commonly used as a precursor for poly imides. As mentioned herein above, the poly (amic acid) is possibly decomposed to a terminal amine radical and a terminal acid anhydride radical by depolymerization due to the reaction equilibrium when it is stored in liquid state, or when it is being processed into a desired shape or when it is subjected to thermal imidification. In addition, terminal acid anhydride radical is formed as a result of the decomposition in a small amount and will react with water flown in from outside or produced during the imidification and thus will be transformed into dicarboxylic acid. The dicarboxylic acid can no longer react with the amine terminal radical and the molecular weight of the poly (amic acid) will decrease with time when stored.

Such decrease in the molecular weight of the poly (amic acid) affects the characteristics of the poly imide produced therefrom. The product of the poly imide is undesirably deteriorated in its mechanical intensity and other chemical and physical properties.

STEP 2: Preparation of Poly (amic ester) by Partial Esterification of Poly (amic acid)

In order to avoid the above stated problem of poly (amic acid), the present invention provides a poly (imide amic ester) of formula (1) as a stable precursor by partially esterifying amic acid radicals of the poly (amic acid) having a repeating unit of formula (5) and then imidifying chemically unreacted remaining amic acid radicals.

As a starting material for preparing poly (imide amic ester) as a stable precursor, poly (amic acid) prepared by the afore-mentioned process can be used. Also, poly (amic acid) and the solution thereof sold in the market or prepared by usual known processes can be used.

However, if hexamethylene phosphoramide, is not included, 20–90% of hexamethylene phosphoramide relative to the amount of the total organic solvent can be added before chemical imidification.

The partial esterification by which poly (amid acid) is esterified partially with alkyl halide to produce poly (amic ester) can be carried out under the same conditions as a common esterification reaction known publicly in the pertinent field. According to the present invention, the partial esterification can be classified according to the base used as a catalyst as follows;

Method A: Partial esterification using an inorganic base as a catalyst such as an alkali carbonate, Method B: Partial esterification of Method A using an optional phase transition catalyst, Method C: Partial esterification using an organic base as a catalyst such as DBU. However, other methods for partial esterification which can produce the compounds of the present invention besides the methods of A, B and C under said conditions are also included in the scope of the present invention.

Organic solvents which can be used for the partial esterification of Methods A, B and C are e.g. N-methyl pyrolidone, N,N-dimethyl acetamide, N,N-dimethyl formamide, hexamethylene phosphoramide, or dimethyl sulfoxide as the polar organic solvents. The amount of these solvents required is not particularly restricted and should be adopted according to the amount of the reactants.

The inorganic bases of alkali carbonates which can be used in Method A are e.g. anhydrous potassium carbonate, sodium carbonate, potassium bicarbonate, sodium bicarbonate or the like. The amount of the inorganic base required is not particularly restricted and should be adopted to a suitable amount, preferably in the amount of 0.3 to 1.1 relative to the amount of carboxyl radicals of said poly (amic acid).

The phase transition catalysts which can be used in Method B are e.g. tetraalkyl ammonium halide such as tetrabutyl ammonium chloride or aryltrialkyl ammonium halide such as benzyl trimethyl ammonium chloride. Also common phase transition catalysts usually used in such type of reaction can be used. The amount of the phase transition catalyst required is not particularly restricted and should be adopted according to the amount of the reactants. When a phase transition catalyst is used in the partial esterification of the present invention, it is preferable to use n-methyl pyrolidone as a solvent which has law toxicity and relatively inexpensive.

The organic bases of Method C are e.g. 1.5-diazabicyclo[4,3,0]non-5-ene, 1.8-diazabicyclo[5,4,0]undec-7-ene or the like. The amount of the organic base required is not particularly restricted and should be adopted according to the amount of the reactants. When an organic base is used in the partial esterification of the present invention, it is preferable to use n-methyl pyrolidone as a solvent, which has low toxicity and relatively inexpensive and also has a better solubility than an inorganic base.

The partial esterification of poly (amic acid) can be carried out in the same say as usual processes for esterifying any carboxylic acid known publicly, and preferably be carried out by mixing an anhydrous potassium carbonate, sodium carbonate, potassium bicarbonate or sodium bicarbonate as the alkali carbonate in the amount of 0.1–1.1 relative to the amount of carboxyl radicals in the poly (amic acid) in the poly (amic acid) solution, optionally in the presence of a phase transition catalyst to be completely dissolved under stirring and adding an anhydrous alkyl halide of formula RX wherein R is as defined as herein above and X is Cl, Br or I to react under stirring at 80° C. for 2 to 48 hours. Thus a poly (amic acid ester) is obtained.

When an organic base is used as a catalyst instead of an inorganic base such as alkali carbonate, the reaction may be carried out more easily due to the improved solubility.

STEP 3: Preparation of Poly (imide amic ester)

Poly (amic acid ester) of formula (2) obtained in STEP 2 is mixed with at least one organic amine selected from a tertiary amine such as pyridine, trimethylamine, triethylamine, tripropyl amine or the like together with an acetic anhydride in the amount of respectively, 0.5 to 2.2 equivalent to the amount of the poly (amic acid ester) and is stirred under heating at 30~90° C. at 0.5~10 hours to obtain a solution containing poly (imide amic ester) of formula 1.

The imidifying agent of STEP 3 can be conventional imidifying agents. Preferably at least one organic base and an acetic anhydride can be used in the imidification of the present invention.

When said chemical imidification is completed, the reaction mixture is added into a mixture of water, methanol and ethanol to form a precipitate, and the precipitate is filtered and dried to obtain desired poly (imide amic ester) resin of formula 1. When necessary, said processes of precipitation filtration and drying are repeated to remove unreacted residues and by-products to improve the purity of the poly (imide amic ester) resin.

The rate of esterification and imidification for poly (imide amic ester) obtained by said processes measured by the hydrogen nuclear magnetic resonance ('H-NMR) spectrum.

The rate of esterification of the compound of formula (1) is changeable according to the amount of the organic or inorganic base and alkyl halide added. In the present invention the rate of esterification is preferably adjusted to 0.3~1 in case that the sum of each repeating unit amounts to 1 (l+m+n=1) to attain desired effects. Accordingly the rate of imidification of formula (2) is adjusted to 0.7~0.0.

On the other hand, the solubility of the poly (imide amic ester) of formula (2) in a polar organic solvent such as dimethyl formamide, dimethyl acetamide, -methyl pyrolidone, dimethyl sulfoxide, tetrahydrofuran or the like is changeable according to the structure of Ar and Ar' and the imidification ratio.

When the ratio of imidification is approximately 0.3 or more, the poly (imide amic ester) becomes soluble in said organic solvent.

If the ratio of imidification is too low, a part of the resulted poly (imide amic ester) might be insoluble in the solvent due to the structure of Ar and Ar' and undesirably the workability of the solution becomes poor.

Poly (imide amic ester) of formula (2) obtained in STEP 3 has many advantages when compared to poly (amic acid) of formula (5) previously used as a precursor for preparing poly (imide) due to the esterification of a part of the amic acid radicals and imidification of the rest of the amic acid radicals.

Namely, the poly (imide amic ester) of formula (2) according to the present invention does not have carboxyl radical and thereby removing the problem of molecular weight decrease caused by the reaction with water or other nucleophilic reactants during long-term storage or processing in liquid state. Accordingly, the poly (imide amic ester) of the present invention can be kept for a long time as a precursor per se at room temperature rather than under refrigeration when storing poly (amic acid).

Figure 1:
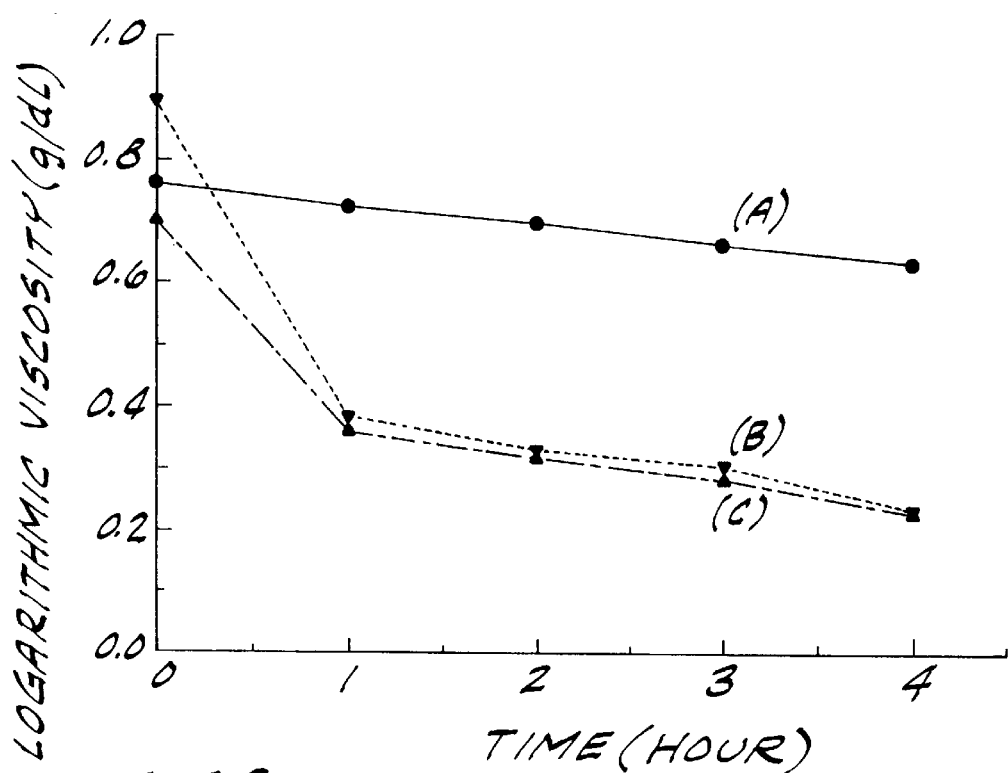
FIG. 1 is a graph showing the viscosity change over time of a poly imide precursor prepared in the Examples and Comparative Examples of the present invention in a solution of a concentration of 0.5 g/dl, wherein (A), (B) and (C) are as follows.

FIG. 1 is a graph showing the viscosity change over time of a solution of previously used polyimide precursor, poly (amic acid), and poly (imide amic ester) of formula 2.

The conventional poly (amic acid) without being partially esterificated according to the present invention shows rapid decrease of viscosity due to the reduction of molecular weight as time goes by. However, the viscosity of the poly (imide amic ester) of the present invention appears not to have changed even after 12 hours.

Further, the poly (imide amic ester) prepared according to the present invention is so stable as to preserve nearly invariable molecular weight even when stored in the state of solution after it is produced. In addition, any excess waste solution generated during or after using it can be recycled for reuse due to its stability.

FIG. 2 and FIG. 3 are graphs showing respectively the result of differential scanning calorimetry and thermogravimetric analysis of the poly (imide amic ester) according to the present invention.

The poly (imide amnic ester) prepared according to the present invention has rich content of imide radical in the molecular and the residual amic acid radicals not imidified are substituted mostly to ester form to provide high stability. Thus even heated at approximately no more than 220° C., the poly (imide amic ester) still remains stable. Accordingly the poly (imide amic ester) is heat resistant and can be used as a high molecule.

However, it is preferable to prepare a high molecule having an even higher heat resistance by processing the poly (imide amic ester) into a desired shape and subjecting it to heat imidification to transform amici ester radicals to produce a poly imide which is imidified completely.

The preparing processes described in STEP 4 below.

STEP 4: Preparation of Poly Imide

Poly (imide amic ester) of the present invention can be transformed to a high molecular compound having an even higher heat resistance by complete imidification under heat.

Poly (imide amic ester) of formula (2) prepared according to the present invention is dissolved in an organic solvent such as dimethyl formamide, dimethyl acetamide, -methyl pyrolidone, dimethyl sulfoxide, tetrahydrofuran, dioxane, o-chlorophenol or the like in a concentration of not more than 70%, preferably not more than 20% and the solution is coated on a board by spin coating or casting and then is dried at 20~150° C. under compulsory air circulation or a reduced pressure to produce a poly (imide amic ester) film that is completely or partly dried.

Said poly (imide amic ester) film is then subjected to heat treatment either in the form attached to the board or in the form of stand alone film. When alcohol is expelled from the amic ester radicals, the imidification is completed. By such heat treatment, poly (imide amic ester) resin of formula (2) is transformed to polyimide resin of formula 6. The above-mentioned heat treatment is characterized in that the temperature is elevated at a rate of 1~20° C./minute regularly from 150° C. to 240~450° C. or in that the temperature is elevated from about 50° C. to 150 to 240~450° C. in an interval of 30 to 120 minutes.

Polyimide of formula (6) obtained by said process does not have any difference from polyimide prepared from poly (amic acid) of formula (5) in their respective chemical structure. However, the poly imide of the present invention is produced by a novel process having the following advantages by employing a novel precursor of poly (imide amic ester).

Firstly, according to the process of the present invention, the peculiar yellow coloring on the ply imide film which was usually caused by the terminal amine radical during the process of heat imidification is prevented to improve photopermeability of poly imide film. Since amine terminal radical of high molecule reacts with acetic anhydride to cause end-capping during the process of preparing the poly (imide amic ester), the release of amine radical due to the reaction equilibrium or depolymerization is prevented.

Such characteristic of poly (imide amic ester) of the present invention eliminates the yellow coloring of polyimide produced by conventional processes. Such property can be recognized easily through comparing the photopermeability of the polyimide resin prepared by the prior art processes and the present invention as shown in FIG. 4.

Secondly, the poly (imide amic ester) of the present invention used as a precursor can be purified easily by reprecipitation to remove impurity of unreacted residue of low molecular weight, anion such as Cl ion or the like.

Accordingly to final product of polyimide produced therefrom has an improved electric characteristic and can be used as an electronic non-conductive material or an insulation material.

Thirdly, the poly (imide amic ester) of formula (2) used as a precursor of the present invention is constituted with sufficient content of imide in its structure so that the number of molecules released during the process of final heat imidification (e.g. alcohol, generally or water molecule) is decreased relatively. Accordingly heat shrinkage caused by the process of heat imidification is decreased greatly.

Thus residual stress caused by the heat shrinkage of the polyimide film prepared is decreased according to the present invention even after the process of heat imidification and the adhesiveness thereof to an object to be coated for use in the electronic industry can be improved.

In addition, the process of the present invention for producing poly imide using the poly (imide amic ester) as a new precursor has many advantages and can be used in various fields.

According to the present invention, poly (imide amic ester) having chemical stability and excellent workability in either liquid state or solid state can be prepared.

The poly (imide amic ester) can be used as a precursor of polyimide, which is a refractory and electronic non-conductive material of high molecular compound. Said poly (imide amic ester) has excellent character when used as a precursor.

EXAMPLES

The present invention will be understood more readily with reference to the following examples; however, these examples are intended to illustrate the invention and are not to be construed to limit the scope of the invention.

The abbreviations used in the following Examples and Tables are defined as in the following Table.

| | | |
|---|---|---|
| Dianhydride | BPDA | 3,3',4,4'-Biphenyl tetracarboxylic acid Dianhydride |
| | BTDA | 3,3',4,4'-Benzophenone tetracarboxylic acid dianhydride |
| | DSDA | 3,3'4,4'-Diphenyl sulfone tetracarboxylic acid dianhydride |
| | 6FDA | 4,4'-(Hexafluro-isopropylidene) diphthalic acid Dianhydride |
| | MPDA | 3,3',4,4'-diphenyl methane tetracarboxylic acid dianhydride |
| | OPDA | 4,4'-Oxydiphthalic acid dianhydride |
| | PMDA | Pyromelitic acid dianhydride |
| Diamine | BDA | 4,4'-Diphenyl diamine |
| | BPA | 4,4'-Diaminobenzophenone |
| | MDA | 4,4'-Methylene dianiline |
| | P-ODA | 4,4'-Oxydianiline |
| | m-PDA | m-Phenylene diamine |
| | p-PDA | p-Phenylene diamine |
| Solvent | DMAe | N,N-Dimethyl acetamide |
| | DMF | Dimethyl formamide |
| | DMSO | Dimethyl sulfoxide |
| | HMPA | Hexamethylene phosphordiamide |
| | NMP | -methyl pyrolidone |
| Alkyl halide | MeBr | Methyl bromide |
| | MeI | Methyl iodide |
| | EtBr | Ethyl bromide |
| | EtI | Ethyl iodide |
| | n-PrBr | n-Propyl bromide |
| | n-PrI | n-Propyl iodide |
| | n-BuI | n-Butyl iodide |
| | n-PenI | n-Pentyl iodide |
| | n-HexI | n-Hexyl iodide |
| | CyHBr | Cyclohexyl bromide |
| | CyHI | Cyclohexyl iodide |
| Imidifying agent | Et$_3$N | Triethyl amine |
| | Py | Pyridine |
| | Ac$_2$O | Acetic anhydride |
| Misc. | Dioxane | Dioxane |
| | THF | Tetrahydrofuran |
| Phase transfer catalyst | BTAC | Benzyltrimethyl ammnium chloride |
| Organic Base | DBU | 1,8-diazabicyclo-[5,4,0]-undec-7-ene |

Example 1

Partial Esterification of Method A

STEP 1: Preparation of Poly (amic acid)

34.04 g of 4,4'-diaminodiphenyl ether as diamine was introduced into a 500-ml round-bottomed flask equipped with a mechanical stirrer and a nitrogen introducing tube and 250 ml of hexamethylene phosphoramide was added to dissolve the solute and then 50 g of 3,3',4,4'-biphenyl tetracarboxylic acid dianhydride as tetracarboxylic acid dianhydride was added gradually under nitrogen stream at room temperature. The mixture was then stirred at room temperature for 24 hours to provide a reaction mixture containing viscous poly (amic acid).

STEP 2: Preparation of Poly (amic acid ester)

To the reaction mixture of poly (amic acid ester) obtained in STEP 1 above was added 11.75 g of anhydrous potassium carbonate to be dissolved completely. Subsequently, 13 ml of ethyl iodide was added and the mixture was stirred at room temperature for 24 hours to provide a poly (amic acid ester).

STEP 3: Preparation of Poly (amic acid ester)

12 ml of pyridine, 1.7 ml of triethylamine and 17 ml of acetic anhydride were added to the solution of poly (amic acid ester) obtained in STEP 2 under stirring in a water bath at 40~50° C. under stirring for 2 hours for imidification to provide a poly (amic acid ester) solution.

The reaction mixture was cooled to room temperature and the mixture of water and methanol in the ratio of 1:1 was poured thereto gradually to form a precipitate.

The precipitate was filtrated, washed with methanol and dried under reduced pressure to provide a light yellow solid of poly (amic acid ester). Yield: 97%

Measurement of Physical and Chemical Properties

Poly (amic acid ester) resin obtained above according to the present invention is soluble in a polar organic solvent of dimethyl formamide, dimethyl acetamide, N-methyl pyrolidone, dimethyl sulfoxide or the like, and the logarithmic viscosity thereof is 1.25 g/dl.

Said poly (amic acid ester) resin was confirmed by $^1$H-NMR spectroscopy and UV spectroscopy to have the structure of formula (1) and a ratio of esterification/imidification of 1:1 approximately.

The result of DSC (differential scanning calorimetry) analysis shows that the glass transition temperature of said resin could not be observed and the endothermic peak originated from the imidification of amic ester radical was observed between 220° C. and 350° C.

As the result of TGA (thermogravimetric analysis), it is observed that the molecular weight decreases of said resin correspond to the amount of ethanol released at the same temperature range (220° C.~350° C.).

Examples 2–51

Poly (amic acid ester) resins were prepared by the same process as in Example 1 except that the reactants and the reaction conditions of STEPS 1 and 2 in Examples 2–51 are based on Table 1 below.

The imidification rate and logarithmic viscosity of the resulted resins are demoted also in Table 1. The abbreviations therein are defined as above.

TABLE 1

| Ex. | Dianhydride (g) | Diamine (g) | Solvent (v/v) | Carbonate (g) | Alkyl halide (ml) | Imidifying agent (ml) | Temp. (° C.) | Time (hr.) | Imidifying ratio | Viscosity* (g/dl) |
|---|---|---|---|---|---|---|---|---|---|---|
| 2 | PMDA (21.82) | m-PDA (10.81) | HMPA/NMP (50/50) | $K_2CO_3$ (6.91) | EtI (4.00) | $Et_3N/Py/Ac_2O$ (1.01/7.12/10.21) | 25 | 2 | 0.5:0.5 | gel* |
| 3 | DSDA (35.83) | m-PDA (10.81) | HMPA (100) | $K_2CO_3$ (6.91) | EtI (4.00) | $Et_3N/Py/Ac_2O$ (1.01/7.12/10.21) | 25 | 2 | 0.5:0.5 | 0.49 |
| 4 | BTDA (32.22) | m-PDA (10.81) | HMPA (100) | $K_2CO_3$ (6.91) | EtI (4.00) | $Et_3N/Py/Ac_2O$ (1.01/7.12/10.21) | 25 | 2 | 0.5:0.5 | 0.53 |
| 5 | 6FDA (44.42) | m-PDA (10.81) | HMPA/NMP (50/50) | $K_2CO_3$ (6.91) | EtI (4.00) | $Et_3N/Py/Ac_2O$ (1.01/7.12/10.21) | 25 | 2 | 0.5:0.5 | 0.50 |
| 6 | BPDA (29.42) | m-PDA (10.81) | HMPA (100) | $K_2CO_3$ (6.91) | EtI (4.00) | $Et_3N/Py/Ac_2O$ (1.01/7.12/10.21) | 25 | 2 | 0.5:0.5 | 0.90 |
| 7 | ODPA (31.02) | m-PDA (10.81) | HMPA (100) | $K_2CO_3$ (6.91) | EtI (4.00) | $Et_3N/Py/Ac_2O$ (1.01/7.12/10.21) | 25 | 2 | 0.5:0.5 | 0.43 |
| 8 | MDPA (30.82) | m-PDA (10.81) | HMPA/NMP (50/50) | $K_2CO_3$ (6.91) | EtI (4.00) | $Et_3N/Py/Ac_2O$ (1.01/7.12/10.21) | 25 | 2 | 0.5:0.5 | 0.45 |
| 9 | PMDA (21.82) | p-PDA (10.81) | HMPA (100) | $K_2CO_3$ (6.91) | EtI (4.00) | $Et_3N/Py/Ac_2O$ (1.01/7.12/10.21) | 25 | 2 | 0.5:0.5 | gel* |
| 10 | DSDA (35.83) | p-PDA (10.81) | HMPA/DMF (50/50) | $K_2CO_3$ (6.91) | EtI (4.00) | $Et_3N/Py/Ac_2O$ (1.01/7.12/10.21) | 25 | 2 | 0.5:0.5 | 0.57 |
| 11 | BTDA (32.22) | p-PDA (10.81) | HMPA (100) | $K_2CO_3$ (6.91) | EtI (4.00) | $Et_3N/Py/Ac_2O$ (1.01/7.12/10.21) | 25 | 2 | 0.5:0.5 | gel* |
| 12 | 6FDA (44.42) | p-PDA (10.81) | HMPA (100) | $K_2CO_3$ (6.91) | EtI (4.00) | $Et_3N/Py/Ac_2O$ (1.01/7.12/10.21) | 25 | 2 | 0.5:0.5 | 1.01 |
| 13 | BPDA (29.42) | p-PDA (10.81) | HMPA (100) | $K_2CO_3$ (6.91) | EtI (4.00) | $Et_3N/Py/Ac_2O$ (1.01/7.12/10.21) | 25 | 2 | 0.5:0.5 | gel* |
| 14 | ODPA (31.02) | p-PDA (10.81) | HMPA/DMAc (50/50) | $K_2CO_3$ (6.91) | EtI (4.00) | $Et_3N/Py/Ac_2O$ (1.01/7.12/10.21) | 25 | 2 | 0.5:0.5 | 0.46 |
| 15 | MDPA (30.82) | p-PDA (10.81) | HMPA (100) | $K_2CO_3$ (6.91) | EtI (4.00) | $Et_3N/Py/Ac_2O$ (1.01/7.12/10.21) | 25 | 2 | 0.5:0.5 | 0.47 |
| 16 | PMDA (21.82) | p-ODA (20.02) | HMPA/DMAc (50/50) | $K_2CO_3$ (6.91) | EtI (4.00) | $Et_3N/Py/Ac_2O$ (1.01/7.12/10.21) | 25 | 2 | 0.5:0.5 | gel* |
| 17 | DSDA (35.83) | p-ODA (20.02) | HMPA (100) | $K_2CO_3$ (6.91) | EtI (4.00) | $Et_3N/Py/Ac_2O$ (1.01/7.12/10.21) | 25 | 2 | 0.5:0.5 | 0.57 |
| 18 | BTDA (32.22) | p-ODA (20.02) | HMPA (100) | $K_2CO_3$ (6.91) | EtI (4.00) | $Et_3N/Py/Ac_2O$ (1.01/7.12/10.21) | 25 | 2 | 0.5:0.5 | 0.49 |
| 19 | 6FDA (44.42) | p-ODA (20.02) | HMPA/DMAc (50/50) | $K_2CO_3$ (6.91) | EtI (4.00) | $Et_3N/Py/Ac_2O$ (1.01/7.12/10.21) | 25 | 2 | 0.5:0.5 | 0.68 |
| 20 | BPDA (29.42) | p-ODA (20.02) | HMPA (100) | $K_2CO_3$ (6.91) | EtI (4.00) | $Et_3N/Py/Ac_2O$ (1.01/7.12/10.21) | 25 | 2 | 0.5:0.5 | 1.48 |
| 21 | ODPA (31.02) | p-ODA (20.02) | HMPA (100) | $K_2CO_3$ (6.91) | EtI (4.00) | $Et_3N/Py/Ac_2O$ (1.01/7.12/10.21) | 25 | 2 | 0.5:0.5 | 0.48 |

TABLE 1-continued

| Ex. | Dianhydride (g) | Diamine (g) | Solvent (v/v) | Carbonate (g) | Alkyl halide (ml) | Imidifying agent (ml) | Temp. (° C.) | Time (hr.) | Imidifying ratio | Viscosity* (g/dl) |
|---|---|---|---|---|---|---|---|---|---|---|
| 22 | MDPA (30.82) | p-ODA (20.02) | HMPA/DMAc (50/50) | K$_2$CO$_3$ (6.91) | EtI (4.00) | Et$_3$N/Py/Ac$_2$O (1.01/7.12/10.21) | 25 | 2 | 0.5:0.5 | 0.46 |
| 23 | BPDA (29.42) | m-PDA (10.81) | HMPA/DMSO (50/50) | K$_2$CO$_3$ (2.76) | EtI (1.60) | Et$_3$N/Py/Ac$_2$O (1.01/7.12/10.21) | 25 | 2 | 0.2:0.8 | gel* |
| 24 | BPDA (29.42) | m-PDA (10.81) | HMPA (100) | K$_2$CO$_3$ (5.53) | EtI (3.20) | Et$_3$N/Py/Ac$_2$O (1.01/7.12/10.21) | 25 | 2 | 0.4:0.6 | 0.92 |
| 25 | BPDA (29.42) | m-PDA (10.81) | HMPA (100) | K$_2$CO$_3$ (8.30) | EtI (4.80) | Et$_3$N/Py/Ac$_2$O (1.01/7.12/10.21) | 25 | 2 | 0.6:0.4 | 0.88 |
| 26 | BPDA (29.42) | m-PDA (10.81) | HMPA (100) | K$_2$CO$_3$ (11.06) | EtI (6.40) | Et$_3$N/Py/Ac$_2$O (1.01/7.12/10.21) | 25 | 2 | 0.8:0.2 | 0.80 |
| 27 | BPDA (29.42) | p-PDA (10.81) | HMPA (100) | K$_2$CO$_3$ (2.76) | EtI (1.60) | Et$_3$N/Py/Ac$_2$O (1.01/7.12/10.21) | 25 | 2 | 0.2:0.8 | gel* |
| 28 | BPDA (29.42) | p-PDA (10.81) | HMPA (100) | K$_2$CO$_3$ (5.53) | EtI (3.20) | Et$_3$N/Py/Ac$_2$O (1.01/7.12/10.21) | 25 | 2 | 0.4:0.6 | gel* |
| 29 | BPDA (29.42) | p-PDA (10.81) | HMPA (100) | K$_2$CO$_3$ (8.30) | EtI (4.80) | Et$_3$N/Py/Ac$_2$O (1.01/7.12/10.21) | 25 | 2 | 0.4:0.6 | gel* |
| 30 | BPDA (29.42) | p-PDA (10.81) | HMPA/DMAc (50/50) | K$_2$CO$_3$ (11.06) | EtI (6.40) | Et$_3$N/Py/Ac$_2$O (1.01/7.12/10.21) | 25 | 2 | 0.8:0.2 | 1.08 |
| 31 | BTDA (32.22) | BDA (21.23) | HMPA (100) | K$_2$CO$_3$ (6.91) | EtI (4.00) | Et$_3$N/Py/Ac$_2$O (1.01/7.12/10.21) | 25 | 2 | 0.5:0.5 | 0.40 |
| 32 | BTDA (32.22) | DPSA (24.83) | HMPA/NMP (30/70) | K$_2$CO$_3$ (6.91) | EtI (4.00) | Et$_3$N/Py/Ac$_2$O (1.01/7.12/10.21) | 25 | 2 | 0.5:0.5 | 0.38 |
| 33 | BTDA (32.22) | MDA (19.83) | HMPA (100) | K$_2$CO$_3$ (6.91) | EtI (4.00) | Et$_3$N/Py/Ac$_2$O (1.01/7.12/10.21) | 25 | 2 | 0.5:0.5 | 0.41 |
| 34 | BTDA (32.22) | BPA (18.42) | HMPA (100) | K$_2$CO$_3$ (6.91) | EtI (4.00) | Et$_3$N/Py/Ac$_2$O (1.01/7.12/10.21) | 25 | 2 | 0.5:0.5 | 0.52 |
| 35 | BPDA (29.42) | p-ODA (20.02) | HMPA (100) | K$_2$CO$_3$ (6.91) | MeI (3.11) | Et$_3$N/Py/Ac$_2$O (1.01/7.12/10.21) | 25 | 2 | 0.5:0.5 | 0.54 |
| 36 | BPDA (29.42) | p-ODA (20.02) | HMPA (100) | K$_2$CO$_3$ (6.91) | MeBr (i.44) | Et$_3$N/Py/Ac$_2$O (1.01/7.12/10.21) | 25 | 2 | 0.5:0.5 | 0.53 |
| 37 | BPDA (29.42) | p-ODA (20.02) | HMPA (100) | K$_2$CO$_3$ (6.91) | EtBr (3.73) | Et$_3$N/Py/Ac$_2$O (1.01/7.12/10.21) | 25 | 2 | 0.5:0.5 | 0.48 |
| 38 | BPDA (29.42) | p-ODA (20.02) | HMPA (100) | K$_2$CO$_3$ (6.91) | n-PrI (4.88) | Et$_3$N/Py/Ac$_2$O (1.01/7.12/10.21) | 25 | 2 | 0.5:0.5 | 0.39 |
| 39 | BPDA (29.42) | p-ODA (20.02) | HMPA/NMP (30/70) | K$_2$CO$_3$ (6.91) | iso-PrI (4.88) | Et$_3$N/Py/Ac$_2$O (1.01/7.12/10.21) | 25 | 2 | 0.5:0.5 | 0.42 |
| 40 | BPDA (29.42) | p-ODA (20.02) | HMPA/NMP (30/70) | K$_2$CO$_3$ (6.91) | n-PrBr (4.57) | Et$_3$N/Py/Ac$_2$O (1.01/7.12/10.21) | 25 | 2 | 0.5:0.5 | 0.38 |
| 41 | BPDA (29.42) | p-ODA (20.02) | HMPA (100) | K$_2$CO$_3$ (6.91) | n-BuI (5.69) | Et$_3$N/Py/Ac$_2$O (1.01/7.12/10.21) | 25 | 2 | 0.5:0.5 | 0.44 |
| 42 | BPDA (29.42) | p-ODA (20.02) | HMPA (100) | K$_2$CO$_3$ (6.91) | CyHI (6.47) | Et$_3$N/Py/Ac$_2$O (1.01/7.12/10.21) | 25 | 2 | 0.5:0.5 | 0.35 |
| 43 | BPDA (29.42) | p-ODA (20.02) | HMPA (100) | K$_2$CO$_3$ (6.91) | CyHBr (6.16) | Et$_3$N/Py/Ac$_2$O (1.01/7.12/10.21) | 25 | 2 | 0.5:0.5 | 0.37 |
| 44 | 6PDA (44.42) | m-PDA (10.81) | HMPA (100) | Na$_2$CO$_3$ (5.30) | EtI (4.00) | Et$_3$N/Py/Ac$_2$O (1.01/7.12/10.21) | 25 | 2 | 0.5:0.5 | 0.51 |
| 45 | PMDA (21.81) | p-ODA (20.02) | HMPA/NMPO (30/70) | K$_2$CO$_3$ (6.91) | EtI (4.00) | Et$_3$N/Py/Ac$_2$O (10.12/0.00/10.21) | 25 | 2 | 0.5:0.5 | gel* |
| 46 | PMDA (21.81) | p-ODA (20.02) | HMPA (100) | K$_2$CO$_3$ (6.91) | EtI (4.00) | Et$_3$N/Py/Ac$_2$O (2.02/6.33/10.21) | 25 | 2 | 0.5:0.5 | gel* |
| 47 | PMDA (21.81) | p-ODA (20.02) | HMPA/NMP (30/70) | K$_2$CO$_3$ (6.91) | EtI (4.00) | Et$_3$N/Py/Ac$_2$O (0.00/7.91/10.21) | 25 | 2 | 0.5:0.5 | 1.24 |
| 48 | PMDA (21.81) | p-ODA (20.02) | HMPA (100) | K$_2$CO$_3$ (6.91) | EtI (4.00) | Et$_3$N/Py/Ac$_2$O (0.51/7.51/10.21) | 25 | 2 | 0.5:0.5 | gel* |
| 49 | BPDA (29.42) | m-PDA (10.81) | HMPA/NMP (60/40) | K$_2$CO$_3$ (6.91) | EtI (4.00) | Et$_3$N/Py/Ac$_2$O (1.01/7.12/10.21) | 25 | 2 | 0.5:0.5 | 0.67 |
| 50 | BPDA (29.42) | m-PDA (10.81) | HMPA/NMP (50/50) | K$_2$CO$_3$ (6.91) | EtI (4.00) | Et$_3$N/Py/Ac$_2$O (1.01/7.12/10.21) | 25 | 2 | 0.5:0.5 | 0.54 |
| 51 | BPDA (29.42) | m-PDA (10.81) | HMPA/DMAc (30/70) | K$_2$CO$_3$ (6.91) | EtI (4.00) | Et$_3$N/Py/Ac$_2$O (1.01/7.12/10.21) | 25 | 2 | 0.5:0.5 | 0.46 | gel*: After reaction, gel is formed which is not dissolved in solvent.
Viscosity*: logarithmic viscosity Example 52

Partial Esterification of Method B

STEP 1: Preparation of Poly (amic acid)

1.22 g (0.0113 mole) of m-phenylene diamine as diamine was introduced into a 100-ml round bottom flask equipped with a mechanical stirrer and a nitrogen introducing tube and 55 ml of N-methyl pyrolidone was added to dissolve the solute and then 5 g (0.0113 mole) of 4,4'-(hexafluoroisopropylidene) dinaphthalic acid dianhydride as tetracarboxylic acid dianhydride was gradually added under nitrogen stream at room temperature.

The mixture was stirred at room temperature for 24 hours to provide a reaction mixture including viscous poly (amic acid).

STEP 2: Preparation of Poly (amic acid ester)

To the reaction mixture of poly (amic acid) obtained in STEP 1 was added 0.7809 g (0.0057 mole) of anhydrous potassium carbonate and 0.32 g of (0.0017 mole) of benzyltrimethyl ammonium chloride as a phase transfer catalyst to be dissolved completely. Subsequently, 0.45 ml of ethyl iodide was added and the mixture was stirred at room temperature for 24 hours to provide a poly (amic acid ester).

STEP 3: Preparation of Poly (imide amic ester)

0.72 ml of pyridine, 0.23 ml of triethylamine and 1.17 ml of acetic anhydride were added to the solution of poly (amic acid ester) obtained in STEP 2 under stirring and the mixture was kept in a water bath at 40~50° C. under stirring for 2 hours for imidification to provide a poly (imide amic ester) solution.

The reaction mixture was cooled to room temperature and a mixture of water and methanol in the ratio of 1:1 was poured thereto gradually to form a precipitate.

The precipitate was filtered, washed with methanol and dried under reduced pressure to provide a said poly (imide amic ester) resin.

Measurement of Physical and Chemical Properties

Poly (imide amic ester) resin obtained above according to this example is soluble in a polar organic solvent such as dimethyl formamide, dimethyl acetamide, N-methyl pyrolidone, dimethyl sulfoxide or the like, and logarithmic viscosity thereof is 0.61 g/dl.

Said poly (imide amic ester) resin was confirmed by 1H-NMR spectroscopy and UV spectroscopy to have the structure of formula (1) and a ratio esterification/imidification of about 1:1.

The result of DSC (differential scanning calorimetry) analysis showed that the endothermic peak originated from imidification of amic ester radicals was observed between 180~300° C. based on the structure of monomer used and/or carbon chain length of alkyl portion of ester.

In addition, the molecular weigh decrease was observed corresponding to the amount of ethanol released in the same temperature range (180~300° C.).

Examples 53–76

Poly (imide amic ester) resins were prepared by the same process as in Example 52 except that the reactants and the reaction conditions of STEPS 1 and 2 of Example 53 to 76 are based on Table 2 below.

The imidification ratio and logarithmic viscosity of the resulted resins are denoted also in Table 2.

The abbreviations therein are defined as above.

TABLE 2

| Ex | Dianhydride (g) | Diamine (g) | Solvent (v/v) | PTS* (g) | Carbonate (g) | Alkyl halide (ml) | Imidifying agent (ml) | Temp (° C.) | Time (hr.) | Imidifying ratio | Viscosity* (g/dl) |
|----|----|----|----|----|----|----|----|----|----|----|----|
| 53 | PMDA (5.00) | m-PDA (2.49) | NMP (100) | BTAC (0.77) | $K_2CO_3$ (1.59) | EtI (0.92) | Py/$Et_3$N/$Ac_2$O (1.49/0.64/2.17) | 25 | 2 | 0.5:0.5 | gel* |
| 54 | BPDA (5.00) | m-PDA (1.84) | NMP (100) | BTAC (0.59) | $K_2CO_3$ (1.17) | EtI (0.68) | Py/$Et_3$N/$Ac_2$O (1.10/0.47/1.60) | 25 | 2 | 0.5:0.5 | 0.85 |
| 55 | BTDA (5.00) | m-PDA (1.73) | NMP (100) | BTAC (0.53) | $K_2CO_3$ (1.11) | EtI (0.64) | Py/$Et_3$N/$Ac_2$O (1.04/0.45/1.51) | 25 | 2 | 0.5:0.5 | 0.49 |
| 56 | DSDA (5.00) | m-PDA (1.51) | NMP (100) | BTAC (0.47) | $K_2CO_3$ (0.97) | EtI (0.56) | Py/$Et_3$N/$Ac_2$O (0.91/0.39/1.32) | 25 | 2 | 0.5:0.5 | 0.78 |
| 57 | ODPA (5.00) | m-PDA (1.73) | NMP (100) | BTAC (0.53) | $K_2CO_3$ (1.11) | EtI (0.64) | Py/$Et_3$N/$Ac_2$O (1.04/0.45/1.51) | 25 | 2 | 0.5:0.5 | 0.40 |
| 58 | PMDA (5.00) | p-PDA (2.49) | DMF (100) | BTAC (0.77) | $K_2CO_3$ (1.59) | EtI (0.92) | Py/$Et_3$N/$Ac_2$O (1.49/0.64/2.17) | 25 | 2 | 0.5:0.5 | gel* |
| 59 | BPDA (5.00) | p-PDA (1.84) | DMF (100) | BTAC (0.59) | $K_2CO_3$ (1.17) | EtI (0.68) | Py/$Et_3$N/$Ac_2$O (1.10/0.47/1.60) | 25 | 2 | 0.5:0.5 | gel* |
| 60 | 6FDA (5.00) | p-PDA (1.22) | DMF (100) | BTAC (0.37) | $K_2CO_3$ (0.76) | EtI (0.44) | Py/$Et_3$N/$Ac_2$O (0.71/0.31/1.04) | 25 | 2 | 0.5:0.5 | 0.67 |
| 61 | BTDA (5.00) | p-PDA (1.73) | DMF (100) | BTAC (0.53) | $K_2CO_3$ (1.11) | EtI (0.64) | Py/$Et_3$N/$Ac_2$O (1.04/0.45/1.51) | 25 | 2 | 0.5:0.5 | gel* |
| 62 | DSDA (5.00) | p-PDA (1.51) | DMF (100) | BTAC (0.47) | $K_2CO_3$ (0.97) | EtI (0.56) | Py/$Et_3$N/$Ac_2$O (0.91/0.39/1.32) | 25 | 2 | 0.5:0.5 | 0.82 |
| 63 | ODPA (5.00) | p-PDA (1.73) | DMF (100) | BTAC (0.53) | $K_2CO_3$ (1.11) | EtI (0.64) | Py/$Et_3$N/$Ac_2$O (1.04/0.45/1.51) | 25 | 2 | 0.5:0.5 | 0.45 |
| 64 | PMDA (5.00) | p-PDA (4.60) | DMAc (100) | BTAC (0.77) | $K_2CO_3$ (1.59) | EtI (0.92) | Py/$Et_3$N/$Ac_2$O (1.49/0.64/2.17) | 25 | 2 | 0.5:0.5 | gel* |
| 65 | BPDA (5.00) | p-ODA (3.40) | DMAc (100) | BTAC (0.59) | $K_2CO_3$ (1.17) | EtI (0.68) | Py/$Et_3$N/$Ac_2$O (1.10/0.47/1.60) | 25 | 2 | 0.5:0.5 | 1.05 |
| 66 | 6FDA (5.00) | p-ODA (2.20) | DMAc (100) | BTAC (0.37) | $K_2CO_3$ (0.76) | EtI (0.44) | Py/$Et_3$N/$Ac_2$O (0.71/0.31/1.04) | 25 | 2 | 0.5:0.5 | 0.76 |
| 67 | BTDA (5.00) | p-ODA (3.20) | DMAc (100) | BTAC (0.53) | $K_2CO_3$ (1.11) | EtI (0.64) | Py/$Et_3$N/$Ac_2$O (1.04/0.45/1.51) | 25 | 2 | 0.5:0.5 | 0.61 |
| 68 | DSDA (5.00) | p-ODA (2.80) | DMAc (100) | BTAC (0.47) | $K_2CO_3$ (0.97) | EtI (0.56) | Py/$Et_3$N/$Ac_2$O (0.91/0.39/1.32) | 25 | 2 | 0.5:0.5 | 0.59 |
| 69 | ODPA (5.00) | p-ODA (3.20) | DMAc (100) | BTAC (0.53) | $K_2CO_3$ (1.11) | EtI (0.64) | Py/$Et_3$N/$Ac_2$O (1.04/0.45/1.51) | 25 | 2 | 0.5:0.5 | 0.42 |
| 70 | BPDA (5.00) | p-ODA (3.40) | DMF (100) | BTAC (0.59) | $K_2CO_3$ (1.17) | MeI (0.53) | Py/$Et_3$N/$Ac_2$O (1.49/0.64/2.17) | 25 | 2 | 0.5:0.5 | 0.85 |
| 71 | BPDA (5.00) | p-ODA (3.40) | DMF (100) | BTAC (0.59) | $K_2CO_3$ (1.17) | EtI (0.68) | Py/$Et_3$N/$Ac_2$O (1.10/0.47/1.60) | 25 | 2 | 0.5:0.5 | 1.12 |
| 72 | BPDA (5.00) | p-ODA (3.40) | DMF (100) | BTAC (0.59) | $K_2CO_3$ (1.17) | PrI (0.83) | Py/$Et_3$N/$Ac_2$O (0.71/0.31/1.04) | 25 | 2 | 0.5:0.5 | 0.89 |
| 73 | BPDA (5.00) | p-ODA (3.40) | DMF (100) | BTAC (0.59) | $K_2CO_3$ (1.17) | iso-PrI (0.85) | Py/$Et_3$N/$Ac_2$O (0.71/0.31/1.04) | 25 | 2 | 0.5:0.5 | 0.67 |
| 74 | BPDA (5.00) | p-ODA (3.40) | DMF (100) | BTAC (0.59) | $K_2CO_3$ (1.17) | ButI (0.97) | Py/$Et_3$N/$Ac_2$O (1.04/0.45/1.51) | 25 | 2 | 0.5:0.5 | 0.89 |

TABLE 2-continued

| Ex | Dianhydride (g) | Diamine (g) | Solvent (v/v) | PTS* (g) | Carbonate (g) | Alkyl halide (ml) | Imidifying agent (ml) | Temp (° C.) | Time (hr.) | Imidifying ratio | Viscosity* (g/dl) |
|---|---|---|---|---|---|---|---|---|---|---|---|
| 75 | BPDA (5.00) | p-ODA (3.40) | DMF (100) | BTAC (0.59) | K$_2$CO$_3$ (1.17) | PenI (1.11) | Py/Et$_3$N/Ac$_2$O (0.91/0.39/1.32) | 25 | 2 | 0.5:0.5 | 0.86 |
| 76 | BPDA (5.00) | p-ODA (3.40) | DMF (100) | BTAC (0.59) | K$_2$CO$_3$ (1.17) | HexI (1.29) | Py/Et$_3$N/Ac$_2$O (1.04/0.45/1.51) | 25 | 2 | 0.5:0.5 | 0.79 | gel*: After reaction, gel is formed which is not dissolved in solvent.
Viscosity*: logarithmic viscosity
PTS*: Phase transfer catalyst Example 77

Partial Esterification of Method C

STEP 1: Preparation of Poly (amic acid)

3.40 g (0.0170 mole) of 4,4'-oxydianiline as diamine was introduced into a 100-ml round bottom flask equipped with a mechanical stirrer and a nitrogen introducing tube and 75 ml of N-methyl pyrolidone was added to dissolve the solute and then 5 g (0.0170 mole) of 3,3',4,4'-biphenyl tetracarboxylic acid dianhydride as tetracarboxylic acid dianhydride was gradually added under nitrogen stream at room temperature.

The mixture was stirred at room temperature for 24 hours to provide a reaction mixture including viscous poly (amic acid).

STEP 2: Preparation of Poly (amic acid ester)

To the reaction mixture of poly (amic acid) obtained in STEP 1 was added 1.27 ml (0.0085 mole) of DBU. Subsequently, 0.68 ml (0.0085 mole) of ethyl iodide was added and the mixture was stirred at room temperature for 24 hours to provide a poly (amic acid ester).

STEP 3 Preparation of Poly (imide amic ester)

1.08 ml of pyridine, 0.34 ml of triethylamine and 1.74 ml of acetic anhydride were added to the solution of poly (amic acid ester) obtained in STEP 2 above under stirring and the mixture was kept in a water bath at 40~50° C. under stirring for 2 hours for imidification to provide a poly (imide amic ester) solution.

The reaction mixture was cooled to room temperature and a mixture of water and methanol in the ratio of 1:1 was poured thereto gradually to form a precipitate. The precipitate was filtered, washed with methanol and dried under reduced pressure to provide a said poly (imide amic ester) resin.

Measurement of Physical and Chemical Properties

Poly (imide amic ester) resin obtained above according to this example is soluble in a polar organic such as dimethyl formamide, dimethyl acetamide, N-methyl pyrolidone, dimethyl sulfoxide or the like, and logarithmic viscosity thereof is 1.18 g/dl.

Said poly (imide amic ester) resin was confirmed by 1H-NMR spectroscopy and UV spectroscopy to have the structure of formula (1) and a ratio esterification/imidification of about 1:1.

The result of DSC (differential scanning calorimetry) analysis showed that the endothermic peak originated from imidification of amic ester radicals was observed between 180~300° C. based on the structure of monomer used and/or the carbon chain length of alkyl portion of ester. The glass transition temperature thereof also varies according to the structure of monomer used and/or the carbon chain length of alkyl portion of ester. In addition, the result of TGA shows that the molecular weight decreases corresponding to the amount of ethanol released in the same temperature range (180~300° C.).

Examples 78–99

Poly (imide amic ester) resins were prepared by the same process as in Example 77 except that the reactants and the reaction conditions of STEPS 1 and 2 of Example 78 to 99 are based on Table 3 below.

The imidification ratio and logarithmic viscosity of the resulted resins are denoted also in Table 3. The abbreviations therein are defined as above.

TABLE 3

| Ex. | Dianhydride (g) | Diamine (g) | Solvent (v/v) | Organic base (g) | Alkyl halide (ml) | Imidifying agent (ml) | Temp. (° C.) | Time (hr.) | Imidifying ratio | Viscosity* (g/dl) |
|---|---|---|---|---|---|---|---|---|---|---|
| 78 | PMDA (5.00) | m-PDA (2.49) | NMP (100) | DBU (1.72) | EtI (0.92) | Py/Et$_3$N/Ac$_2$O (1.49/0.64/2.17) | 25 | 2 | 0.5:0.5 | gel* |
| 79 | BPDA (5.00) | m-PDA (1.84) | NMP (100) | DBU (1.27) | EtI (0.68) | Py/Et$_3$N/Ac$_2$O (1.10/0.47/1.60) | 25 | 2 | 0.5:0.5 | 0.75 |
| 80 | 6FDA (5.00) | m-PDA (1.19) | NMP (100) | DBU (0.82) | EtI (0.44) | Py/Et$_3$N/Ac$_2$O (0.71/0.31/1.04) | 25 | 2 | 0.5:0.5 | 0.54 |
| 81 | BTDA (5.00) | m-PDA (1.73) | NMP (100) | DBU (1.20) | EtI (0.64) | Py/Et$_3$N/Ac$_2$O (1.04/0.51/1.51) | 25 | 2 | 0.5:0.5 | 0.63 |
| 82 | DSDA (5.00) | m-PDA (1.51) | NMP (100) | DBU (1.05) | EtI (0.56) | Py/Et$_3$N/Ac$_2$O (0.91/0.39/1.32) | 25 | 2 | 0.5:0.5 | 0.45 |
| 83 | ODPA (5.00) | m-PDA (1.73) | NMP (100) | DBU (1.20) | EtI (0.64) | Py/Et$_3$N/Ac$_2$O (1.04/0.45/1.51) | 25 | 2 | 0.5:0.5 | 0.41 |
| 84 | PMDA (5.00) | p-ODA (4.60) | NMP (100) | DBU (1.72) | EtI (0.92) | Py/Et$_3$N/Ac$_2$O (1.49/0.64/2.17) | 25 | 2 | 0.5:0.5 | gel* |
| 85 | 6FDA (5.00) | p-ODA (2.20) | NMP (100) | DBU (0.82) | EtI (0.44) | Py/Et$_3$N/Ac$_2$O (0.71/0.31/1.04) | 25 | 2 | 0.5:0.5 | 0.72 |

TABLE 3-continued

| Ex. | Dianhydride (g) | Diamine (g) | Solvent (v/v) | Organic base (g) | Alkyl halide (ml) | Imidifying agent (ml) | Temp. (° C.) | Time (hr.) | Imidifying ratio | Viscosity* (g/dl) |
|---|---|---|---|---|---|---|---|---|---|---|
| 86 | BTDA (5.00) | p-ODA (3.20) | NMP (100) | DBU (1.20) | EtI (0.64) | Py/Et₃N/Ac₂O (1.04/0.45/1.51) | 25 | 2 | 0.5:0.5 | 0.59 |
| 87 | DSDA (5.00) | p-ODA (2.80) | NMP (100) | DBU (1.05) | EtI (0.56) | Py/Et₃N/Ac₂O (0.91/0.39/1.32) | 25 | 2 | 0.5:0.5 | 0.64 |
| 88 | ODPA (5.00) | p-ODA (3.20) | NMP (100) | DBU (1.20) | EtI (0.64) | Py/Et₃N/Ac₂O (1.04/0.45/1.51) | 25 | 2 | 0.5:0.5 | 0.45 |
| 89 | 6FDA (5.00) | p-PDA (1.19) | NMP (100) | DBU (0.82) | MeI (0.34 | Py/Et₃N/Ac₂O (0.71/0.31/1.04) | 25 | 2 | 0.5:0.5 | 0.71 |
| 90 | 6FDA (5.00) | p-PDA (1.19) | NMP 9100) | DBU (0.82) | EtI (0.44) | Py/Et₃N/Ac₂O (0.71/0.31/1.04) | 25 | 2 | 0.5:0.5 | 0.68 |
| 91 | 6FDA (5.00) | p-PDA (1.19) | NMP (100) | DBU (0.82) | PrI (0.54) | Py/Et₃N/Ac₂O (0.71/0.31/1.04 | 25 | 2 | 0.5:0.5 | 0.69 |
| 92 | 6FDA (5.00) | p-PDA (1.19) | NMP (100) | DBU (0.82) | iso-PrI (0.55) | Py/Et₃N/Ac₂O (0.71/0.31/1.04) | 25 | 2 | 0.5:0.5 | 0.57 |
| 93 | 6FDA (5.00) | p-PDA (1.19) | NMP (100) | DBU (0.82) | ButI (0.63) | Py/Et₃N/Ac₂O (0.71/0.31/1.04) | 25 | 2 | 0.5:0.5 | 0.63 |
| 94 | 6FDA (5.00) | p-PDA (1.19) | NMP (100) | DBU (0.82) | PenI (0.72) | Py/Et₃N/Ac₂O (0.71/0.31/1.04) | 25 | 2 | 0.5:0.5 | 0.65 |
| 95 | 6FDA (5.00) | p-PDA (1.19) | NMP (100) | DBU (0.82) | HexI (0.83) | Py/Et₃N/Ac₂O (0.71/0.31/1.04) | 25 | 2 | 0.5:0.5 | 0.54 |
| 96 | BPDA (5.00) | p-ODA (3.40) | NMP (100) | DBU (0.51) | EtI (0.27) | Py/Et₃N/Ac₂O (1.76/0.76/2.57 | 25 | 2 | 0.2:0.8 | gel* |
| 97 | BPDA (5.00) | p-ODA (3.40) | NMP (100) | DBU (1.02) | EtI (0.54) | Py/Et₃N/Ac₂O (1.32/0.57/1.92 | 25 | 2 | 0.4:0.6 | 1.10 |
| 98 | BPDA (5.00) | p-ODA (3.40) | NMP (100) | DBU (1.53) | EtI (0.82) | Py/Et₃N/Ac₂O (0.88/0.38/1.28) | 25 | 2 | 0.6:0.4 | 0.82 |
| 99 | BPDA (5.00) | p-ODA (3.40) | NMP (100) | DBU (2.03) | EtI (1.09) | Py/Et₃N/Ac₂O (0.44/0.19/0.64) | 25 | 2 | 0.8:0.2 | 0.78 | gel*: After reaction, gel is formed which is not dissolved in solvent.
Viscosity*: logarithmic viscosity Comparative Example 1

Preparation of Poly (amic acid ester) Resin without Chemical Imidification (STEP 3)

Except that the step of chemical imidification (STEP 3) is not carried out, poly (amic acid ester) was prepared by the process of Example 1, which was then purified by reprecipitation from methanol.

Comparative Example 2

Preparation of Poly (amic acid) Resin without STEPS 2 and 3 of the Present Invention To a solution of 4,4'-diaminodiphenyl ether in N-methyl pyrolidone was added gradually 3,3',4,4'-biphenyl tetracarboxylic acid dianhydride under nitrogen stream at room temperature and the mixture was stirred at room temperature to provide a viscous poly (amic acid).

The reaction of STEPS 2 and 3 of the present invention are not carried out and the resulted poly (amic acid) was used as a comparative precursor for the preparation of polyimide resin.

Comparison of Stability 0.5 g of poly (imide amic ester) resin obtained in Example 1 and 0.5 g of poly (amic acid ester) resin obtained in Comparative Example 1 were dissolved in NMP respectively to prepare respectively a 1 dl solution. Meanwhile, the reaction mixture of Comparative Example 2 was diluted with N-methyl pyrolidone to prepare a diluted solution having a concentration of 0.5 g/dl.

The logarithmic viscosities of the said three solutions were measured with Ubbe-Lodde viscometer at 30° C.

In order to determine the change of logarithmic viscosity of each solution over time, 20 ml of each said three solutions were filled in five samples respectively which was kept in oven at 80° C.

The samples of each solution were then taken out one at a time at intervals of 1, 2, 4, 8 and 16 hours to determine their respective logarithmic viscosity.

FIG. 1 attached is a graph showing the change of logarithmic viscosity over time as set forth hereinabove.

It is recognized from the attached FIG. 1 that the change of viscosity over time of the above three solutions is from small to large in the order of poly (imide amic ester) obtained in Example 1, poly (amic acid ester) obtained in Comparative Example 1 and poly (amic acid) obtained in Comparative Example 2. Particularly, the logarithmic viscosity of poly (imide amic ester) prepared according to the present invention appeared to have changed by extremely little in comparison with the other ones.

Accordingly, the stability of the poly (imide amic ester) solution of the present invention shows to be prominently excellent during storage as compared with other two precursors of polyimide.

Example 100

Preparation of Polyimide Film 2 g of the poly (imide amic ester) resin obtained in Example 1 was dissolved in 10 ml of dimethyl formamide and is cast on a glass plate and was then dried in an oven having a compulsory circulation system at 80° C. for one hour and then was subjected to an elevating temperature at a rate of 10° C./min until the temperature reaches 150° C., the glass plate is then kept at this temperature for one hour and then subsequently was subjected to an elevating temperature at a rate of 2° C./min until the temperature reaches 350° C., at which the glass plate is kept for an hour to produce a polyimide resin.

The resulted polyimide resin was light yellow and transparent having thickness of 20 mm. The result of TGA (thermogravimetric analysis) shows that at a temperature of 570° C., the weight of polyimide resin decreases by about 5%. The result of DSC shows that its glass transition temperature could not be confirmed at the temperature of less than 450° C.

Examples 101–138

Polyimide films were prepared according to the process of Example 100 except that the polyimide resins obtained in Examples 2 to 52 were used.

Table 4 reports relevant parameters used in each of respective examples together with casting solvents used and temperatures of final imidification in each Examples.

TABLE 4

| Ex. | Resin (Ex. No) | Solvent for casting | Temp.* (° C.) |
|---|---|---|---|
| 101 | 3 | NMP | 400 |
| 102 | 4 | DMSO | " |
| 103 | 5 | NMP | " |
| 104 | 6 | " | 350 |
| 105 | 7 | " | " |
| 106 | 8 | DMF | 400 |
| 107 | 10 | DMAc | " |
| 108 | 12 | NMP | " |
| 109 | 14 | " | 370 |
| 110 | 15 | 1,4-Dioxane | 350 |
| 111 | 17 | DMSO | 400 |
| 112 | 18 | NMP | 350 |
| 113 | 19 | THF | 370 |
| 114 | 20 | NMP | 400 |
| 115 | 21 | DMSO | " |
| 116 | 22 | NMP | 350 |
| 117 | 24 | " | " |
| 118 | 25 | DMSO | 400 |
| 119 | 26 | NMP | " |
| 120 | 30 | DMF | 350 |
| 121 | 31 | " | 400 |
| 122 | 32 | " | 370 |
| 123 | 33 | " | 350 |
| 124 | 34 | DMAc | 400 |
| 125 | 35 | " | " |
| 126 | 36 | " | 350 |
| 127 | 37 | NMP | 400 |
| 128 | 38 | " | 350 |
| 129 | 39 | DMSO | 400 |
| 130 | 40 | NMP | 370 |
| 131 | 41 | " | " |
| 132 | 42 | " | 400 |
| 133 | 43 | " | 350 |
| 134 | 44 | THF | " |
| 135 | 47 | DMAc | 400 |
| 136 | 49 | NMP | 350 |
| 137 | 50 | " | 400 |
| 138 | 51 | " | " |

Temp.*: Maximum temperature for Imidificaiton

What is claimed is:

1. A poly (amic acid ester) random copolymer of formula (1),

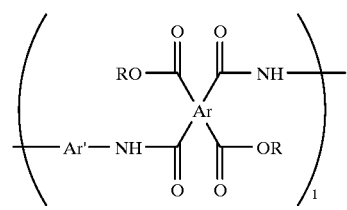

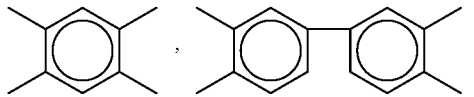

wherein Ar is at least one selected from the group consisting of I

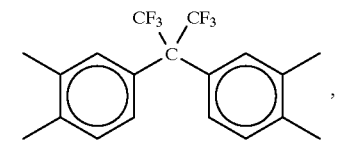

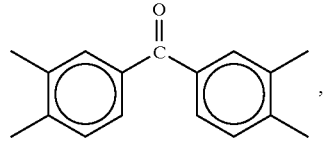

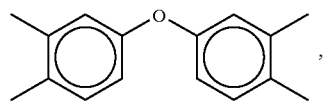

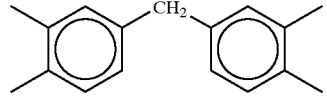

and

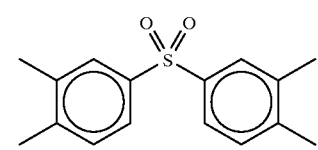

Ar' is at least one selected from the group consisting of

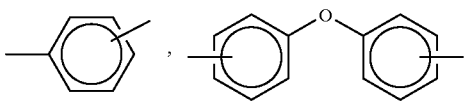

-continued

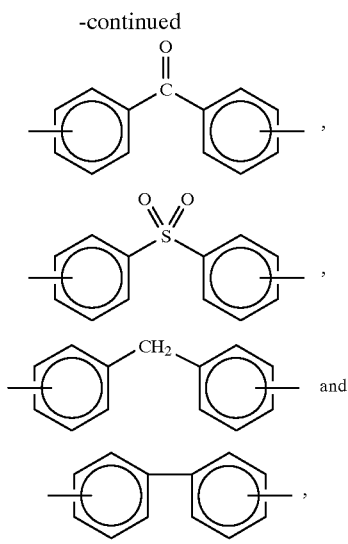

R is at least one selected from the group consisting of $CH_3$, $CH_2CH_3$, $CH(CH_3)_2$, $(CH_2)_2CH_3$, $(CH_2)_3CH_3$, $C(CH_3)_3$ and $CH_2CH(CH_3)_2$, and l, m, and n represents independently a number between 0 and 1, provided that when l+m+n=1, the total content of amic acid radical (COOH) included in each repeating unit is in the ratio of 0.0 to 0.7 and the total content of amic ester radical (COOR) included in each repeating unit is in the ratio of 1.0 to 0.3.

2. A process for preparing a poly (amic acid ester) random copolymer of formula (1)

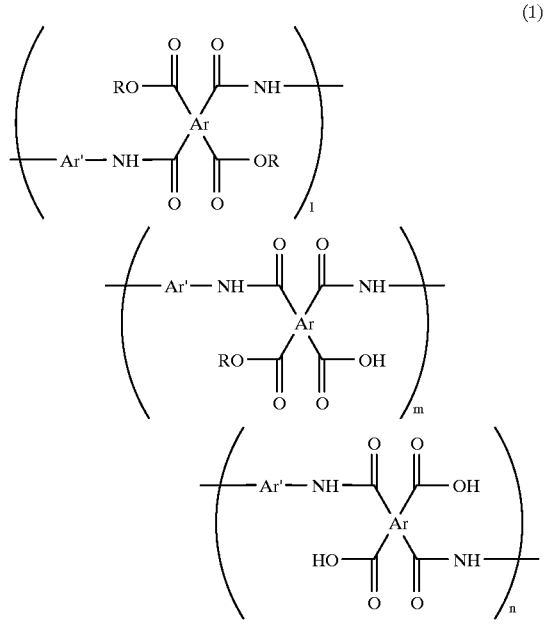

wherein, Ar, Ar', l, m and n are as defined in claim 1, which comprises reacting a tetracarboxylic acid dianhydride monomer of formula (3)

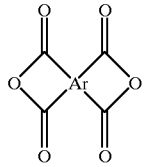

wherein Ar is as defined in claim 1 with a diamine monomer of formula (4)

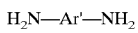

$H_2N—Ar'—NH_2$ (4)

wherein Ar' is as defined in claim 1 to produce a poly (amic acid) having a repeating unit of formula (5)

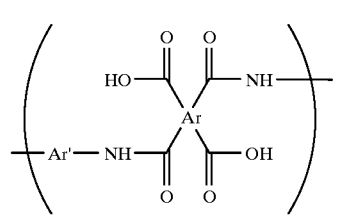

wherein Ar and Ar' are as defined in claim 1; and esterifying partly the poly (amic acid) with an alkyl halide of formula RX in which R is defined as in claim 1, X is a radical selected from Cl, Br and I in an optional solvent in the presence of a base catalyst and optionally a phase transition catalyst.

3. The process for preparing the poly (amic acid ester) random copolymer as claimed in claim 2, wherein the step of partial esterification is performed in at least one polar organic solvent selected from the group consisting of N-methyl pyrolidone, N,-dimethyl acetamide, N,N-dimethyl formamide, hexamethylene phosphoramide and dimethyl sulfoxide.

4. The process for preparing the poly (amic acid ester) random copolymer as claimed in claim 2, wherein the step of esterification is performed under stirring at a temperature of from room temperature to 80° C. for 2 to 48 hours.

5. The process for preparing the poly (amic acid ester) random copolymer as claimed in claim 2, wherein the base catalyst is a carbonate selected from the group consisting of anhydrous potassium carbonate, sodium carbonate, potassium bicarbonate, and sodium bicarbonate, said base catalyst is in a ratio of 0.3 to 1.1 with carboxyl radicals in the repeating unit of formula (5) of the poly (amic acid).

6. The process for preparing the poly (amic acid ester) random copolymer as claimed in claim 5, wherein at least one phase transition catalyst selected from the group consisting of tetraalkyl ammonium halide and aryltrialkyl ammonium halide is additionally used.

7. The process for preparing poly (amic acid ester) random copolymer as claimed in claim 5, wherein at least one phase transition catalyst selected from the group consisting of 1.5-diazabicyclo[4,3,0]non-5-ene and 1.8-diazabicyclo[5,4,0]undec-7-ene is used as the base.

8. A poly (amic acid ester) random copolymer of formula (2)

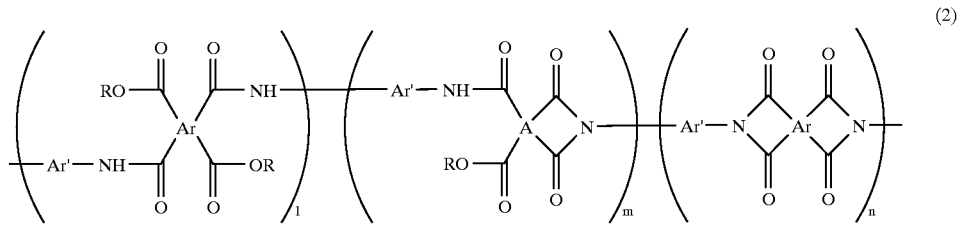

wherein Ar, Ar', R, l, m and n are as defined in claim 1.

9. A process for preparing a poly (amic acid ester) of formula (2)

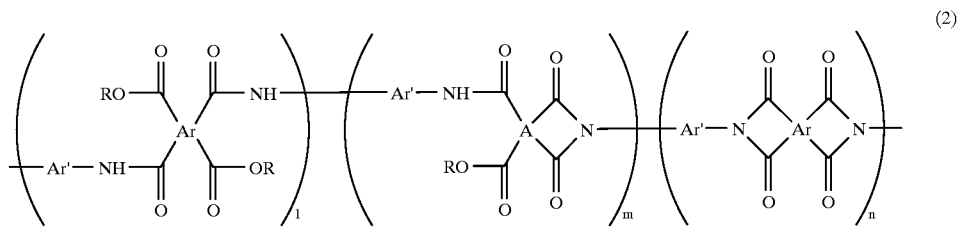

wherein Ar, Ar', R, l, m and n are as defined in claim 1, which comprises imidifying partly amic acid radical of a poly (amic acid ester) of formula (1)

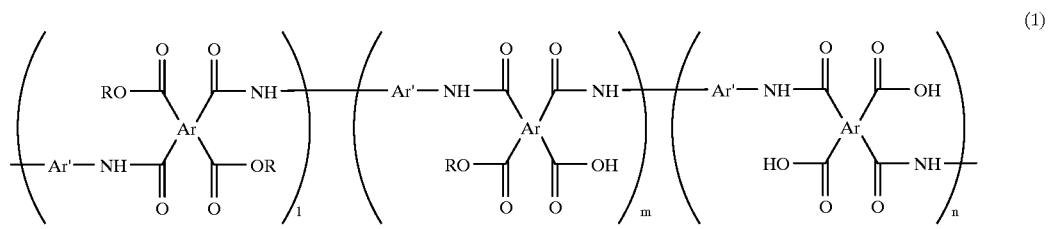

wherein Ar, Ar', R, l, m and n are as defined in claim 1.

10. The process for preparing poly (amic acid ester) as claimed in claim 9, wherein the poly (amic acid ester) of formula (1) is mixed with at least one organic amine selected from the group consisting of pyridine, trimethylamine, triethylamine, and tripropyl amine in the amount of 0.5 to 2.2 equivalent and an acetic anhydride and then the mixture is stirred under heating at 30 to 90° C. for 0.5 to 10 hours.

11. A process for preparing a polyimide of formula (6)

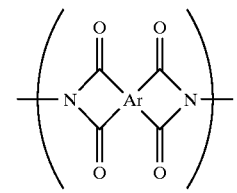

wherein Ar is as defined in claim 1, which comprises drying a poly (amic acid ester) of formula (2)

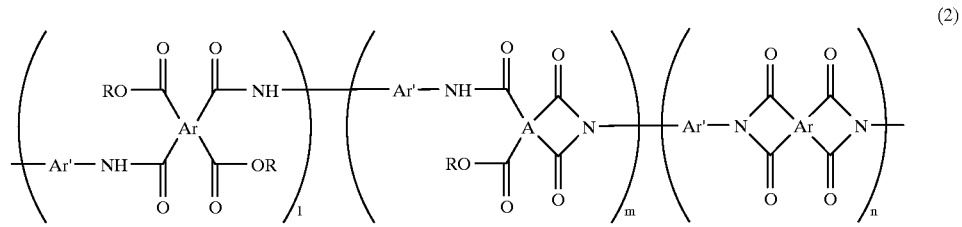
wherin Ar, Ar', R, l, m and n are as defined in claim 1 at less than 200° C. to remove solvent, which is then heated at a temperature elevated at an elevating rate of 1–20° C./minute regularly from about 150° C. to 240–450° C. or at a temperature which is elevated from about 50° C. to about 150° C. to 240–450° C. in an interval of 30 to 120 minutes.
* * * * *